(12) United States Patent
Fabbri et al.

(10) Patent No.: US 10,600,075 B2
(45) Date of Patent: Mar. 24, 2020

(54) PROACTIVE WEB CONTENT ATTRIBUTE RECOMMENDATIONS

(71) Applicant: ADOBE INC., San Jose, CA (US)

(72) Inventors: Jason Christopher Fabbri, Roseville, CA (US); Melanie Anne Megregian, Boca Raton, FL (US)

(73) Assignee: Adobe Inc., San Jose, CA (US)

( * ) Notice: Subject to any disclaimer, the term of this patent is extended or adjusted under 35 U.S.C. 154(b) by 259 days.

(21) Appl. No.: 15/713,339

(22) Filed: Sep. 22, 2017

(65) Prior Publication Data

US 2019/0095945 A1   Mar. 28, 2019

(51) Int. Cl.
*G06Q 30/02* (2012.01)

(52) U.S. Cl.
CPC ..... *G06Q 30/0244* (2013.01); *G06Q 30/0277* (2013.01)

(58) Field of Classification Search
CPC .................................................. G06Q 30/0244
USPC .......................................................... 705/14
See application file for complete search history.

(56) References Cited

U.S. PATENT DOCUMENTS

| | | | | |
|---|---|---|---|---|
| 9,134,978 B1 * | 9/2015 | Roskind | ................ | G06F 16/958 |
| 9,367,524 B1 * | 6/2016 | Filev | ................... | G06F 17/2247 |
| 9,396,483 B2 * | 7/2016 | Hamedi | ............. | G06F 16/24578 |
| 2012/0116868 A1 * | 5/2012 | Chin | ................... | G06Q 30/0203 |
| | | | | 705/14.43 |
| 2014/0040067 A1 * | 2/2014 | England | ............. | G06Q 30/0282 |
| | | | | 705/26.7 |
| 2014/0372901 A1 * | 12/2014 | Catlin | .................... | G06Q 30/02 |
| | | | | 715/745 |
| 2015/0100377 A1 * | 4/2015 | Penumaka | ............ | G06F 16/951 |
| | | | | 705/7.29 |

FOREIGN PATENT DOCUMENTS

WO   WO-2015027223 A1 *   2/2015

\* cited by examiner

*Primary Examiner* — Colleen A Hoar
(74) *Attorney, Agent, or Firm* — Shook, Hardy & Bacon, L.L.P.

(57) ABSTRACT

Methods and systems are provided for providing suggested edits for content placed into a webpage under construction using a webpage content recommendation system. Attributes associated with placed content added to a webpage under construction can be compared with predictive content to determine if any edits are predicted to increase effectives of the webpage. Predictive content can be content that is the same, or similar to, the placed content added to the webpage. Predictive content can be taken from a webpage in the same category as the webpage (e.g., a category can be vertical sporting goods stores or healthcare providers) or from deployed pages on the same website as the webpage. In this way, a suggested edit can be determined based on the predictive content and provided to a user.

16 Claims, 8 Drawing Sheets

PROACTIVE WEB CONTENT ATTRIBUTE RECOMMENDATIONS

BACKGROUND

Creators of webpages generally design webpages and/or web forms to encourage webpage visitors to interact with content on the webpage. To this end, webpages are typically created by placing content onto the webpage in a manner that promotes interaction by a webpage visitor. Successful interaction by a webpage visitor with webpage content can indicate effectiveness of the webpage. Increasing effectiveness means that a webpage visitor will be more likely to interact with, click, understand, etc. the content on the webpage. In other words, on an effective webpage the content catches the attention of webpage visitors, interests and appeals to visitors, encourages action by visitors, and results in visitor satisfaction with the webpage as a whole. Effectiveness can be measured, for example, by how webpage visitors interact with the content of the webpage (e.g., clicks on a button). Failing to incorporate content on a webpage in a manner that encourages interaction by webpage visitors can result in a webpage failing to fulfill its designated purpose (e.g., registering for a website or buying a product).

Conventional methods for generating effective webpages utilize business intelligence or analytics products that collect data from deployed webpages. The collected data corresponding with the deployed webpages can provide insight about webpage visitors, products, webpage interactions, and/or business trends. Some conventional methods focus on providing analytics data to a user (e.g., an analyst and/or webpage designer) for evaluation to determine the effectiveness of content of a deployed webpage. Such methods require that a user create a webpage, deploy the webpage, and then evaluate gathered analytics data about the deployed webpage to determine if any changes should be made that can increase effectiveness. In many cases, this is an iterative process of analyzing effectiveness, updating the webpage, analyzing effectiveness, and then making additional changes. Accordingly, such conventional methods can be costly in time and effort. Additionally, depending on how long it takes for a user to implement changes to a webpage, the deployed webpage can be less than effective for a prolonged period of time. As described, these existing methods primarily rely on trial and error in creation of an effective webpage based on making adjustments using analytics data gathered for a deployed webpage.

SUMMARY

Embodiments of the present disclosure are directed towards a proactive webpage content recommendation system for suggesting edits predicted to increase effectiveness of content on a webpage. In accordance with embodiments, such suggestions can be provided in real time to a user during construction of the webpage as content is placed onto the webpage. Advantageously, such a proactive web content recommendation system is capable of making suggestions predicted to make a webpage more effective prior to deployment. In this way, the webpage that is deployed is likely to effectively perform its desired function immediately upon deployment. As such, a webpage with incorporated suggested edits is less likely to require substantial edits after deployment.

A webpage content recommendation system can provide suggested edits before a webpage is deployed by analyzing analytics data associated with predictive content to determine content attribute edits for the webpage that are likely to increase effectiveness. Content attributes can include positioning on the webpage, sizing, color scheme, image features, text features, etc. Predictive content can be determined by comparing content of the webpage under construction to find the same, or similar, content on previously deployed webpages of the same, or similar, category (e.g., sign-in webpage of a vertical sporting goods website) as the webpage under construction and/or other webpages of the website upon which the webpage under construction resides. When the webpage content recommendation system determines that an edit to an attribute of placed content is likely to increase effectiveness of the webpage, the edit can be provided to a user as a suggested edit. Further, the user can select to apply such an edit so that the suggested edit is applied to the content attribute of the webpage.

DETAILED DESCRIPTION

Figure 1:
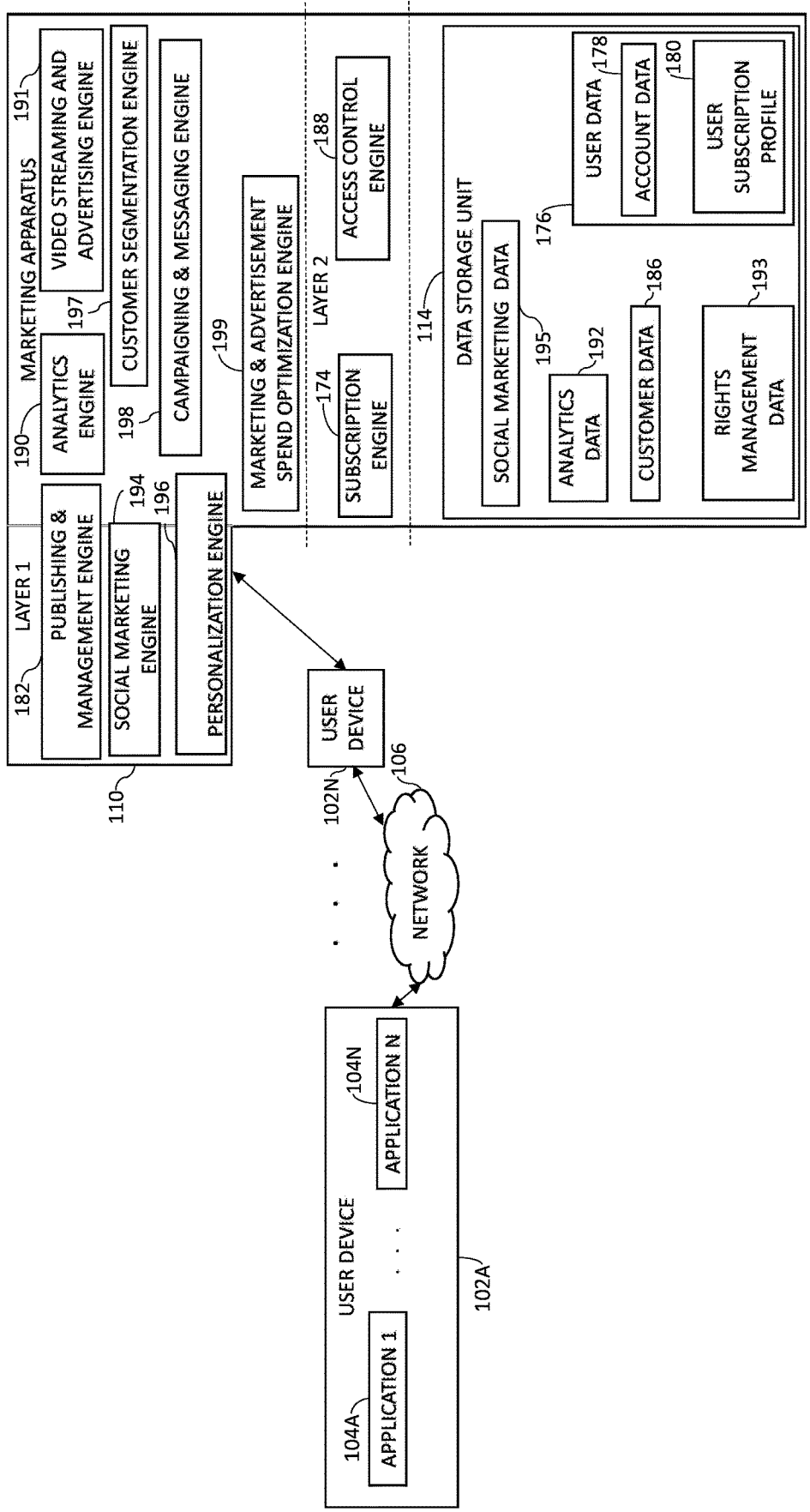
FIG. 1 depicts a diagram of an environment in which one or more embodiments of the present disclosure can be practiced, in accordance with various embodiments of the present disclosure.

When creating websites, users endeavor to place content in a manner that ensures that each webpage of the site fulfills its desired purpose. For instance, placement of content of a webpage can play a large role in effectiveness. With a limited amount of viewable real estate on a webpage, how content is laid out can greatly affect how effectively webpage visitors interact with content on the webpage. This is especially true as the amount of viewable content can change when websites are presented on various devices. As such, data analytics can be used to determine, for example, how effective content is likely to be in a particular location on a webpage. However, to gather data analytics about the effectiveness of a webpage, that page needs to be deployed to gather webpage visitor interactions. This requirement can lead to the deployment of ineffective pages that are not fulfilling their desired purposes (e.g., a webpage with the purpose of encouraging website visitors to register, is not registering any visitors). While generally referred to as a webpage, this should be read to include traditional webpages and/or web forms, etc.

With the advancement of technology, suggestion tools have been used to provide recommendations to users. Such recommendations, however, are generally very limited in application and narrow in scope. For instance, real-time suggestions for correction of grammatical or spelling errors are found across many computing applications. These recommendations, however, are application specific and fail to provide proactive suggestions for content predicted to increase effectiveness of content placed on webpage prior to deployment. For instance, increasing effectiveness such that a webpage visitor will be more likely to interact with, click, understand, etc. the content on the webpage. As such, existing technologies are generally deficient in proactively providing suggested edits for placed content on a webpage.

Accordingly, embodiments of the present invention are directed to proactively providing suggested edits for attributes of content placed on a webpage prior to deployment of the page. In particular, and as described herein, edits can be suggested to a user for review upon placing content onto a webpage under construction. Providing suggestions relating to content attributes can offer better insight into how webpage visitors interact with content on a website based on the category of the site and/or page. Further, suggested edits can reduce the amount of time and effort a user spends building a new webpage that effectively carries out its desired purpose.

In this regard, predictive content that is similar to placed content can be determined based on the predicting content being the same, or similar to the placed content (e.g., both log-in buttons, both webpage headers, etc.). Predictive content can be taken from a webpage in the same category as the webpage (e.g., a category can be sporting goods stores or healthcare providers) or from deployed pages on the same website as the webpage. As such, the webpage content recommendation engine can utilize analytics data from "live" pages to predict the success of attributes of content as the content in placed into a webpage. Alternatively, or in addition, predictive content can implement some level of machine learning related to attributes of the placed content. In this way, suggested edits can be provided to a user during construction of a webpage based on a predictive comparison that edits to the content will increase effectiveness of the webpage.

After predictive content is determined, attributes of the placed content can be compared with the attributes of predictive content to assess whether any edits to the content attributes are likely to result in a more effective webpage. Suggested edits can be determined by examining analytics data related to the predictive content to determine attributes with proved success on a live webpage. At a high-level, to generate a suggested edit, content attributes are determined for content placed into a webpage. These placed content attributes are compared with the attributes of predicted content, particularly successful attributes of the predicted content, as indicated by analytics data showing effectiveness of the attributes. Successful attributes can be indicated using analytics data that has been collected for the predictive content. One analytics-related suggestion as discussed herein includes a suggested edit of changing the attribute of placement on the webpage (e.g., moving a button to a different placement on the page is likely to result in more user interaction with the button). In addition to providing suggestions for individual placed content, overall content of a webpage can be compared with predictive content to determine whether adding content to a page is likely to increase effectiveness. For example, suggesting that a bold header should be added to a webpage. Such analytics-related recommendations may facilitate a more effective webpage upon deployment. Although generally described that suggested edits are made prior to deployment of a webpage, it should be appreciated that suggested edits can be made prior to initial deployment of a webpage and/or at any point in the life of a webpage when the page is under construction, for example, when making edits to update a previously deployed webpage.

Turning to FIG. 1, FIG. 1 is a diagram of an environment 100 in which one or more embodiments of the present disclosure can be practiced. The environment 100 includes one or more user devices, such as a user devices 102A-102N. Examples of the user devices include, but are not limited to, a personal computer (PC), tablet computer, a desktop computer, a processing unit, any combination of these devices, or any other suitable device having one or more processors. Each user device can include various products, applications or services supported by the marketing apparatus 110 via the network 106. It is to be appreciated that following description may generally refer to the user device 102A as an example and any other user device can be used.

A user of the user device can utilize various products, applications, or services supported by the marketing apparatus 110 via the network 106. The user devices 102A-102N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manages digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes the marketing apparatus 110.

User devices 102A-102N can be connected to the marketing apparatus 110 via a network 106. Examples of the network 106 include, but are not limited to, internet, local area network (LAN), wireless area network, wired area network, wide area network, and the like.

The marketing apparatus 110 includes one or more engines for providing one or more digital experiences to the user. The marketing apparatus 110 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The marketing apparatus 110 also includes a data storage unit 114. The data storage unit 114 can be implemented as one or more databases or one or more data servers. The data storage unit 114 includes data that is used by the engines of the marketing apparatus 110.

In one embodiment, the marketing apparatus 110 can be divided into two layers of engines, i.e. Layer 1 including core engines that provide workflows to the user and Layer 2 including shared engines that are shared among the core engines. Any core engine can call any of the shared engine for execution of corresponding task. In another embodiment, the marketing apparatus does not have layers and each core engine can have an instance of the shared engines. In either embodiment, each core engine can access the data storage unit 114 directly or through the shared engines.

The user of the user device 102A visits a webpage or an application store to explore applications supported by the marketing apparatus 110. The marketing apparatus 110 provides the applications as a software as a service (SaaS), or as a standalone application that can be installed on the user device 102A, or as a combination. The user creates an account with the marketing apparatus 110 by providing user details and also by creating login details. Alternatively, the marketing apparatus 110 can automatically create login details for the user in response to receipt of the user details. The user can also contact the entity offering the services of the marketing apparatus 110 and can get the account created through the entity. The user details are received by a subscription engine 174 and stored as user data 176 in the data storage unit 114. In some embodiments, the user data 114 further includes account data 178 under which the user details are stored.

The user can opt for subscription of one or more engines of the marketing apparatus 110. Based on subscription details of the user, a user subscription profile 180 is generated by the subscription engine 174 and stored. The user subscription profile 180 is stored in the data storage unit 114 and indicates entitlement of the user to various products or services. The user subscription profile 180 also indicates type of subscription, i.e. premium subscription or regular subscription.

The marketing apparatus 110 includes a publishing and management engine 182 that enables the user to create websites. The publishing and management engine 182 provides an end to end workflow to the user right from creation of a websites, to hosting of websites, to publishing of websites, and finally, to management, i.e. editing and republishing, of websites. The publishing and management 182 further includes one or more engines (not shown in FIG. 1), such as asset management engine, website management engine, mobile management engine, form management engine, search engine and community management engine to enable one or more workflows. The user can create websites, mobile application or webpages, using the publishing and management 182. The user can either do the creation or can send it for creation to third party via workflows provided through the publishing and management engine 182. The user then publishes the website and manage it through the publishing and management engine 182. The user can also create communities or forums for discussions with customers and manage the communities through the publishing and management engine 182. The publishing and management engine 182 also provides asset management capabilities including asset searching using various tags and metadata. In addition, the publishing and management engine 182 enables multisite, i.e. multiple websites and mobile pages, management workflows, and commerce, i.e. personalized shopping experiences that incorporate video, social, and other dynamic media, related workflows.

Each engine of the marketing apparatus 110 also stores customer data 186 for the user in the data storage unit 114. The user or the entity of the user can have one or more customers, including potential customers, and hence, the one or more engines of the marketing apparatus 110 store the customer data 186. The customer data 186 can be shared across these engines or can be specific to each engine. The access to the customer data 186 is controlled by an access control engine 188 which can be shared across the engines of the marketing apparatus 110 or each engine can have one instance of the access control engine 188. The access control engine 188 determines if the user has access to a particular customer data 186 based on the subscription of the user and access rights of the user.

The marketing apparatus 110 also includes an analytics engine 190. The user can enable tracking of websites while creating the website or at any other point. Various methods of tracking can be used. For example, tracking code can be embedded into the website for tracking and sending tracked data to the analytics engine 190. The analytics engine 190 tracks the data and stores tracked data as analytics data 192. The analytics engine 190 tracks the data and performs meaningful processing of the analytics data 192 to provide various reports to the user. In addition, in one embodiment, the analytics engine 190 also acts as a shared engine and is accessible by other engines to obtain meaningful analysis on the basis of which other engines can offer various functionalities to the user. In another embodiment, each engine can have an instance of the analytics engine 190 which is customized according to need of that engine. The analytics engine 190 also supports predictive intelligence to provide predictions based on the analytics data 192. The analytics engine 190 also stitches information tracked from various sources if website interaction and provides a holistic view, i.e. 360 degrees' view of the analytics data 192.

The marketing apparatus 110 also includes a social marketing engine 194 for providing social marketing related workflows. The social marketing engine 194 allows the user to share the website on social networks, and then manage the website sharing and associated information, such as posts and comments. For example, the social marketing engine 194 provides recommendations to the user to determine when to post which website and to determine how audience will react to the post, helps the user to respond to queries from viewers of post, and performs other managing related to the post. In addition to the social networks, the social marketing engine 194 also provides workflows to manage posts on blogs, and other communities. The social marketing engine 194 provides recommendations by tracking the data on social networks and storing the data as social marketing data 195. The social marketing data 195 is then processed by the social marketing engine 194 to determine recommendations. The social marketing engine 194 can automate many manual workflows. For example, the social marketing engine 194 can perform automatic posting of the post at an appropriate time, automatically respond to queries from post viewers and the like. The social marketing engine 194 uses the analytics engine 190 for tracking data on social networks or can source data from the social networks. The social marketing engine 194 can also be a shared engine which can be accessed by various engines of the marketing apparatus 110. Alternatively, the engines can have an instance of the social marketing engine 194 and can directly access the social marketing data 195.

The marketing apparatus 110 also includes a personalization engine 196. The personalization engine 196 enables the user to provide different digital experiences to the customers when different customers visit same webpage or same application of the user. The personalization engine 196 provides various workflows to the user to create different versions of the webpage or the application and to perform A/B testing. Based on the testing, the user may choose to provide different personalization for different sets of customers. The personalization engine 196 also uses the customer data 186 which can be part of the analytics data 192, in one embodiment, or can be stored separately in another embodiment. The customer data 186 includes customer profiles. The customers, as described herein, also includes mere visitors which are not customers yet. A profile includes one or more attributes of a customer. The customer data 186 is generated by a customer segmentation engine 197 by collecting data from different sources including electronic sources, such as the analytics engine 190, online forms, customer submitting data online, and other online sources, and non-electronic sources including paper forms and other offline sources. The customer data 186 can be shared between users and some of the customer data 186 can be specific to each user and not accessible by other users. In addition, the personalization engine provides automated workflows to enable the personalization including providing recommendations that should be shown to a particular customer segment.

The marketing apparatus 110 also includes a campaigning and messaging engine 198 that enables workflows for the user to perform marketing campaigns including sending marketing emails. The campaigning and messaging engine 198 uses the customer data 186 and generates customer segments for performing marketing campaigns. Alternatively, the campaigning and messaging engine 198 uses customer segmentation engine 197 for generating customer segments. A marketing campaign, as defined herein, includes sending marketing messages to customers. The messages can be sent as electronic mails, mobile messages, push to text, social networks, advertisements, or as any other type of message. The campaigning and messaging engine 198 customizes the messages before the messages are send out. For customization, the campaigning and messaging engine 198 provides automated workflows to the user. The user can specify attributes for customer segmentation and the campaigning and messaging engine 198 automatically picks the customers to whom the message is to be sent and also personalizes the message based on the attributes of the customer segment. The campaigning and messaging engine 198 also provides A/B testing option to the user to test which message to send out of two messages. The campaigning and messaging engine 198 also stores different customer segments for each user in the customer data 186.

The marketing apparatus 110 also includes marketing and advertisement spend optimization engine 199. The marketing and advertisement spend optimization engine 199 helps the user in budget management for running marketing campaigns, showing advertisements on websites, as search results, social advertisements, and other form of advertising. The marketing and advertisement spend optimization engine 199 tracks budget spend of the user and the budget remaining, and based on that performs analysis to recommend advertising channels for maximizing benefit. In addition, the marketing and advertisement spend optimization engine 199 uses the customer data 186 and the analytics data 192, and stitches that data to generate the recommendation. The analytics data 192 includes information on how the marketing performed. The customer data 186 further indicates what type of customers visited the marketing and the analytics data 192 further indicates who all among those customers ended up in performing a transaction.

In various embodiments, the customer data 186 also includes data regarding devices used by the customers. The device data is used for stitching customer data. For example, a customer 1 may use device 1 to visit website A. The customer 1 may user device 2 to visit website B. The website A and the website B may belong to the same user. So, instead of considering customer 1 as two different customers the data including at least one common identifier such as email id helps the user to identify that the two different visits were made by the same customer 1. Also, by doing analysis on the customer data 186 and the analytics data 192, richer customer profiles or segments can be generated. Also, devices that correspond to the same customer can be identified resulting in providing more targeted digital experience to the customer and making benefit for the user.

The marketing apparatus 110 also includes a video streaming and advertising engine 191 that helps the user, such as broadcasters, cable networks and service providers create and monetize engaging and personalized viewing experiences. The video streaming and advertising engine 191 can be implemented to provide a software development kit to the user to build and deliver videos to the customers. In addition, the video streaming and advertising engine 191 provides workflows to the user to insert advertisement within the videos and provides recommendations to the user for locations for advertisement insertion. The recommendations are generated using the analytics data 192 which includes information regarding what portions of video was viewed most and other video analytics data, and also using the customer data 186 which includes customer segments who viewed the video and corresponding advertisement. The video streaming and advertising engine 191 also stores rights management data 193 for different videos for the customers of the user. For example, if a video is paid then the video streaming and advertising engine 191 does not provide access to the customer based on the rights management data 193. Using the rights management data 193, the video streaming and advertising engine 191 protects rights across various devices of the customers. Also, the video streaming and advertising engine 191 includes an authentication engine for authenticating the customers. The customer authentication data can also be stored as part of the customer data 186. The customer authentication data includes login details or other identifiers for the customer.

In accordance with embodiments, application(s) 104 on user device can communicate with marketing apparatus 110. In embodiments, application(s) 104 can include an application, such as application 210 of FIG. 2, that facilitates a webpage content recommendation system making a suggested edit for placed content, based on a predictive analysis that the suggested edit will increase effectiveness of the placed content in a webpage. Such an application can be provided to the user device 102A so that the webpage content recommendation system is accessible via the user device. In this regard, application(s) 104 may be an analytics or business intelligence processing application.

Figure 2:
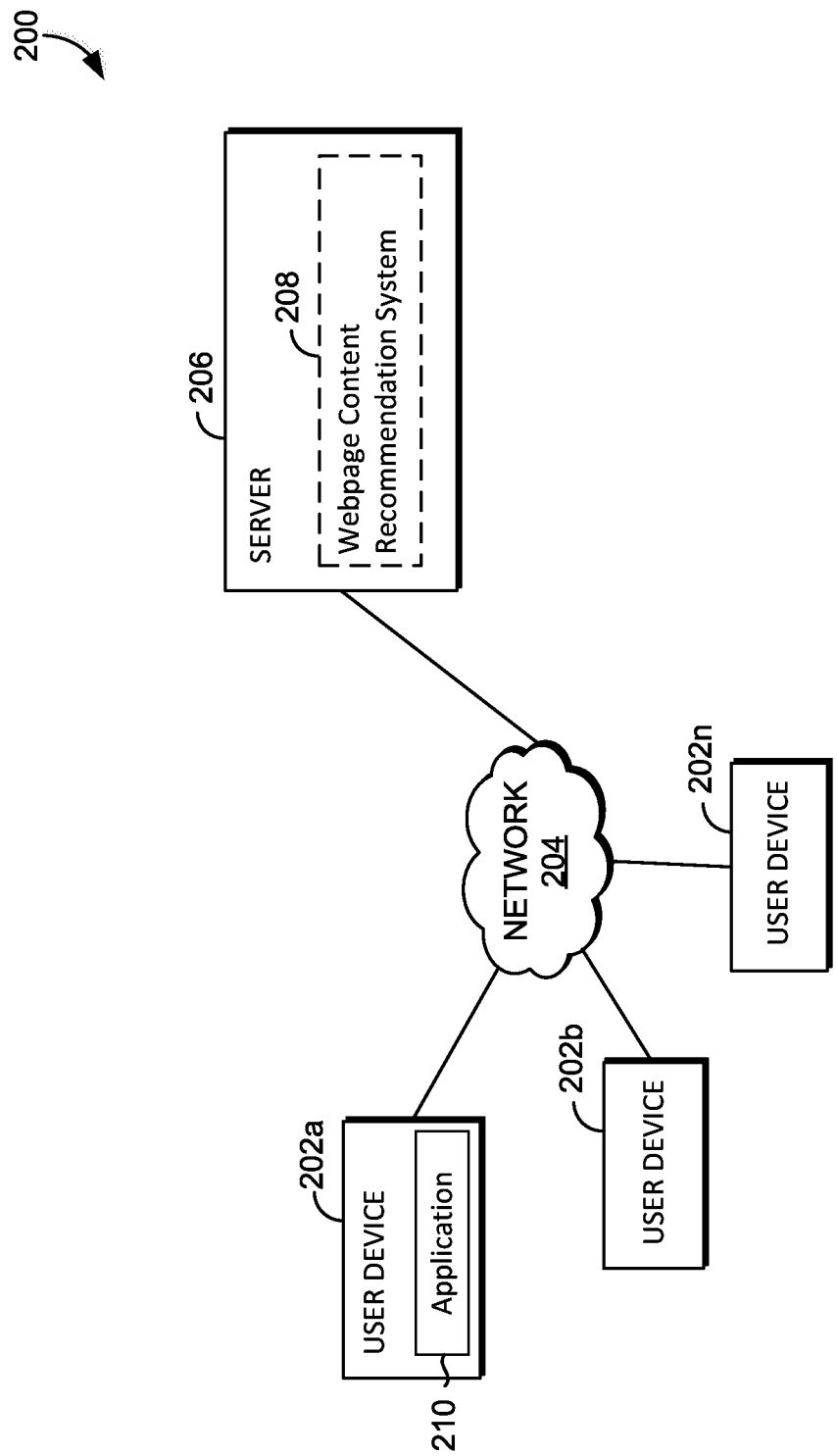
FIG. 2 depicts an example configuration of an operating environment in which some implementations of the present disclosure can be employed, in accordance with various embodiments of the present disclosure.

FIG. 2 depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 200 shown in FIG. 2 is an example of one suitable operating environment. Among other components not shown, operating environment 200 includes a number of user devices, such as user devices 202a and 202b through 202n, network 204, and server(s) 206. Each of the components shown in FIG. 2 may be implemented via any type of computing device, such as one or more of computing device 800 described in connection to FIG. 8, for example. These components may communicate with each other via network 204, which may be wired, wireless, or both. Network 204 can include multiple networks, or a network of networks, but is shown in simple form so as not to obscure aspects of the present disclosure. By way of example, network 204 can include one or more wide area networks (WANs), one or more local area networks (LANs), one or more public networks such as the Internet, and/or one or more private networks. Where network 204 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 204 is not described in significant detail.

It should be understood that any number of user devices, servers, and other components may be employed within operating environment 200 within the scope of the present disclosure. Each may comprise a single device or multiple devices cooperating in a distributed environment.

User devices 202a through 202n can be any type of computing device capable of being operated by a user. For example, in some implementations, user devices 202a through 202n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 210 shown in FIG. 2. Application 210 is referred to as a single application for simplicity, but its functionality can be embodied by one or more applications in practice. As indicated above, the other user devices can include one or more applications similar to application 210.

The application(s) may generally be any application capable of facilitating the exchange of information between the user devices and the server(s) 206 in carrying out providing a suggested edit for placed content, based on a predictive analysis that the suggested edit will increase effectiveness of the placed content in a webpage. In some implementations, the application(s) comprises a web application, which can run in a web browser, and could be hosted at least partially on the server-side of environment 200. In addition, or instead, the application(s) can comprise a dedicated application, such as an application having analytics functionality. In some cases, the application is integrated into the operating system (e.g., as a service and/or program). It is therefore contemplated herein that "application" be interpreted broadly. In embodiments, the application may be integrated with webpage content recommendation system 208.

In accordance with embodiments herein, the application 210 can facilitate providing a suggested edit for placed content, based on a predictive analysis that the suggested edit will increase effectiveness of the placed content in a webpage. In particular, a user can place content (e.g., a button) onto a webpage and then receive a suggested edit for that content, such as, for example, that if the placed content is changed in size, it is predicted button clicks will increase by a percentage (e.g., other buttons in the same category that have gotten a 96% click through on the button and the only differing criteria is that those other buttons were twice the size of the placed button, a suggested edit will be to increase the size of the button). For example, application 210 can be used to provide a suggestion to a user of the user device 202a.

As described herein, server 206 can facilitate providing a recommendation to a user via webpage content recommendation system 208. Server 206 includes one or more processors, and one or more computer-readable media. The computer-readable media includes computer-readable instructions executable by the one or more processors. The instructions may optionally implement one or more components of webpage content recommendation system 208, described in additional detail below. It should be appreciated that while webpage content recommendation system 208 is depicted as a single system, in embodiments, it can function as multiple systems capable of performing all the attributes of the system as described.

Webpage content recommendation system 208 generally provides suggested edits to a user based on an analysis of the effectiveness of attributes of content as the content is placed onto a webpage being developed. Webpage content recommendation system 208 can be implemented by running a comparative assessment between content placed onto the webpage and predictive content. Predictive content can be content that is the same, or similar to, the content added to the webpage (e.g., a "click here to buy" button). Predictive content can be taken from a webpage in the same category as the webpage (e.g., sporting goods stores) or from deployed pages on the same website as the webpage. In this way, gathered analytics data can be examined to determine what attributes of the predictive content appear to play a role in effective content (e.g., the analytics data gathered for the predictive content indicates that content smaller than 68 pixels high yields very few interactions by webpage visitors). The attributes of the predictive content can be compared with the attributes of the placed content to determine suggested edits to the attributes of the placed content that are likely to increase effectiveness. The webpage content recommendation system can also be implemented using machine learning to make proactive suggested edits for placed content, based on a predictive analysis that the suggested edit will increase effectiveness of the placed content in a webpage.

For cloud-based implementations, the instructions on server 206 may implement one or more components of webpage content recommendation system 208. Application 210 may be utilized by a user to interface with the functionality implemented on server(s) 206, such as webpage content recommendation system 208. In some cases, application 210 comprises a web browser. In other cases, server 206 may not be required, as further discussed with reference to FIG. 3.

Thus, it should be appreciated that webpage content recommendation system 208 may be provided via multiple devices arranged in a distributed environment that collectively provide the functionality described herein. Additionally, other components not shown may also be included within the distributed environment. In addition, or instead, a webpage content recommendation system 208 can be integrated, at least partially, into a user device, such as user device 202a. Furthermore, webpage content recommendation system 208 may at least partially be embodied as a cloud computing service.

Figure 3:
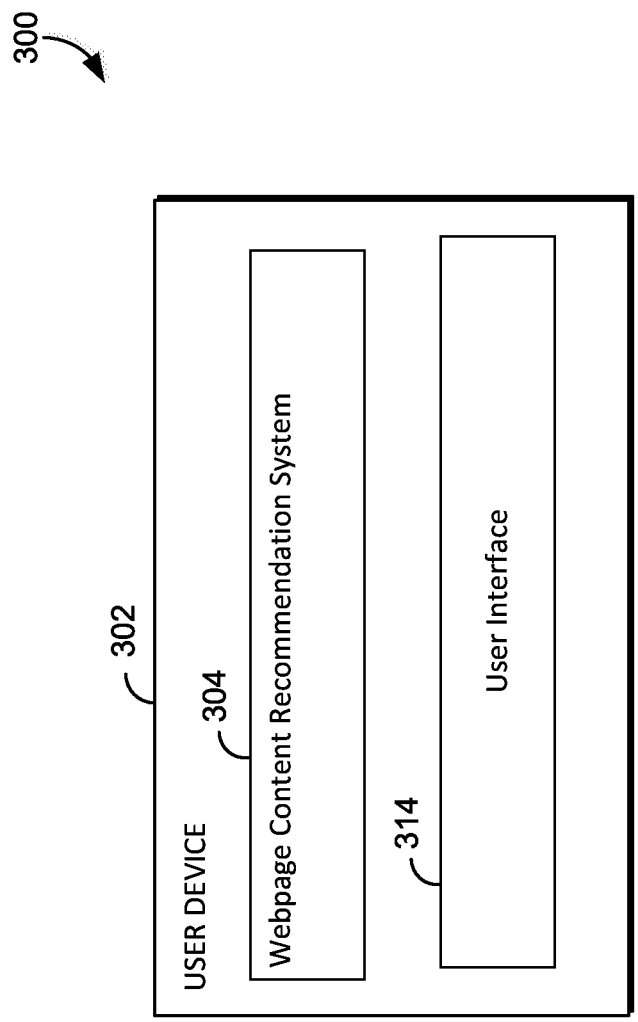
FIG. 3 depicts an example configuration of an operating environment in which some implementations of the present disclosure can be employed, in accordance with various embodiments of the present disclosure.

Referring to FIG. 3, aspects of an illustrative webpage content recommendation system are shown, in accordance with various embodiments of the present disclosure. The components of webpage content recommendation system 304 may be implemented completely on a user device, such as user device 302. A user device can be utilized by a user to create a webpage and/or web form by placing content. In one embodiment, content can be placed using drag-and-drop functionality in an integrated development environment. Upon placing content into a page under construction, a user can indicate, using a user device that they wish to receive suggested edits for attributes of the placed content and/or suggested additional content based on previously placed content. In some cases, such a user device can be used to view suggested edits to placed content. In further cases, a user device can be interacted with by a user to indicate that a suggested edit should be applied to placed content. Interactions can include clicking an "Apply Suggested Edit" button, selecting to apply a suggested edit though touch screen capabilities, vocally indicating a suggested edit should be applied, and/or other methods of user device interaction. It should be appreciated that while webpage content recommendation system 304 is depicted as a single system, in implementations, the functionality of the system can be performed using additional systems.

Figure 4:
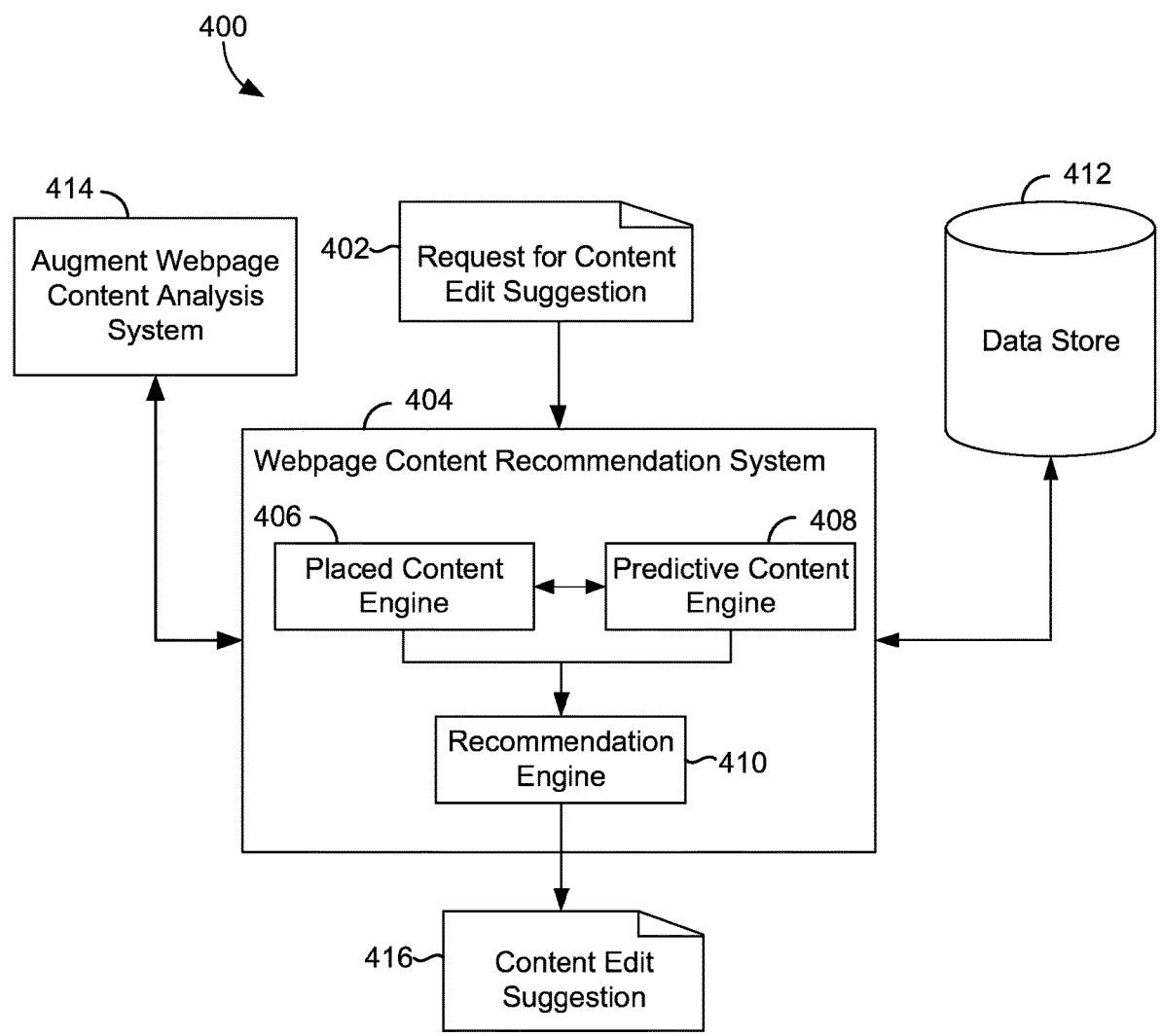
FIG. 4 illustrates and exemplary webpage content recommendation environment for providing a suggested edit regarding placed content of a webpage to a user, in accordance with embodiments of the present disclosure.

Turning now to FIG. 4, FIG. 4 provides an illustrative webpage content recommendation environment 400 for providing a suggested edit regarding placed content within a webpage, in accordance with embodiments of the present disclosure. Data store 412 can store computer instructions (e.g., software program instructions, routines, or services), data, and/or models used in embodiments described herein. In some implementations, data store 412 stores information or analytics data from "live" or deployed webpages. Although depicted as a single component, data store 412 may be embodied as one or more data stores. Further, the information in data store 412 may be distributed in any suitable manner across one or more data stores for storage (which may be hosted externally).

In embodiments, data stored in data store 412 includes collected analytics data. Analytics data generally refers to data collected from deployed webpages, or portions thereof. As such, analytics data can include visitor data, webpage component attributes, information regarding visitor interactions with webpage components, etc. One example of the data store is Adobe® Data Warehouse, which can store collected visitor data. Visitor data includes data related to website visitors, how visitors interact with content on a website, and how visitors interact with content on individual webpages on the site.

In some cases, data can be received directly from user devices or from one or more data stores in the cloud. In other cases, data can be received after data analyzation by a dynamic tag manager (DTM). DTM data can be collected at webpage load time and can include how tags are placed onto the webpage. In this way, the DTM can be used to define aspects (e.g., attributes of content) on a deployed webpage. The DTM is essentially a tool that places code onto a webpage and allows for easy defining of content a user wants to track. In embodiments, the DTM has an out-of-the-box list of aspects that it collects data for and further aspects can be added to that list based on what aspects of a webpage a user wishes to track. DTM data can be inserted into data store 412 for later analysis (e.g., DTM data can be inserted into Adobe Analytics® Data Warehouse). Examples of data tracked and collected by the DTM includes, for example, page scrolls, button clicks, object coordinates on a webpage.

Webpage content recommendation system 404 can provide suggested edits for content placed into a webpage utilizing analytics data associated with predictive content gathered by a business intelligence or analytics program(s). This analytics data can be utilized by the system to allow users to gain insight about how effectively webpage visitors are predicted to interact with content on a webpage under construction based on the predictive content associated with the category of the webpage and/or the purpose of the content. As such, the webpage content recommendation system is capable of facilitating the creation of websites with predicted effectiveness prior to deployment. To provide suggested edits, the webpage content recommendation system can perform a comparison between content placed onto a webpage under construction and predictive content from a deployed website. Predictive content can be content that is the same, or similar to, the content added to the webpage. Predictive content can be taken from a webpage in the same category as the webpage (e.g., a category can be sporting goods stores or healthcare providers) or from deployed pages on the same website as the webpage.

In this way, to initiate providing a suggestion(s), webpage content recommendation system 404 can receive a request for content edit suggestion 402. In some cases, the request may be automatically triggered. For instance, a request for content edit suggestion 402 can be sent automatically when, for example, a user places content into a webpage under construction. As another example, a request can be launched when a user selects to open a virtual assistant in a web development environment. In other cases, a request may be triggered in response to a user selection. For example, a content edit suggestion request may be initiated when a user clicks a "suggest edits" or "help" or "analyze" button. A user may specify when they wish a request to be sent, for instance, by specifying a type of content and/or type of content attribute the user is interested in receiving suggested edits for regarding content placed into a website (e.g., only suggested edits for buttons and/or only suggested edits related to size and/or placement of content but not suggested edits related to color scheme or font).

A request for content edit suggestion 402 can include, or be associated with, information pertaining to placed content, the webpage under construction, and/or the website associated with the webpage under construction. Information about the placed content can include associated content attributes (e.g., positioning on the webpage, sizing, color scheme, image features, text features). Information about the webpage under construction can include previously placed content and/or the purpose of the page. Information about the website can also include information about "live" pages deployed on the site and/or the category of the site (e.g., a category can be sporting goods stores or healthcare providers). Such information can be used to determine predictive content, discussed further below with reference to predictive content engine 408.

Webpage content recommendation system 404 can include placed content engine 406, predictive content engine 408, and recommendation engine 410. The foregoing components of webpage content recommendation system 404 can be implemented, for example, in operating environment 200 of FIG. 2 and/or operating environment 300 of FIG. 3. In particular, these components may be integrated into any suitable combination of user devices 202a and 202b through 202n, and server(s) 206 and/or on user device 302.

Placed content engine 406 of webpage content recommendation system 404 is generally configured to receive a request for content edit suggestion 402. As described herein, placed content refers to the content placed into a webpage under construction. Such content can be an element, image, object, text, item, portion of a webpage, and/or combinations thereof, etc. As previously described, request for content edit suggestion 402 can include information pertaining to placed content, the webpage under construction, and/or the associated website. As such, placed content engine can receive the information from a request for content edit suggestion. In this way, placed content engine 406 can determine and/or receive the attributes associated with placed content. Content attributes are the qualities and/or features regarded as characteristics and/or an inherent part of content. Such attributes can include positioning on the webpage, sizing, color scheme, image features, and text features. Content attributes can be determined by examining individual placed content and/or examining all, or a select set of, placed content.

In embodiments, after an initial request for content edit suggestion is received by the website content recommendation system, placed content engine can limit the information the system utilizes from the request. Information that remains consistent for the webpage under construction (e.g., purpose of the webpage and/or category of the webpage/website) need not be analyzed upon receipt of each request subsequent to an initial request for content placed on the webpage. For example, placed content engine can indicate that predictive content engine 408 should persist information that does not change, such as, for instance, the purpose and/or category of the webpage.

Predictive content engine 408 is generally configured to determine predictive content. Predictive content can be content that is the same, or similar to, placed content that has been added to the webpage. As such, in one embodiment, the predictive content engine can interact with placed content engine 406 to determine predictive content that is the same, or similar to, the placed content. In another embodiment, the predictive content engine can utilize information in the request for content edit suggestion 402 to determine predictive content that is the same, or similar to, the placed content. Predictive content can be taken from a webpage in the same category as the webpage (e.g., a category can be sporting goods stores or healthcare providers) or from deployed pages on the same website as the webpage. As such, upon webpage content recommendation system 404 receiving request for content edit suggestion 402, predictive content engine 408 can determine whether predictive content can be used from other "live" pages on the website with the webpage under construction or whether predictive content should be used from other webpages/websites with the same category/purpose as the webpage under construction. Alternatively, predictive content engine 408 can determine that the system should use predictive content from both other "live" pages on the website with the webpage under construction and other webpages/websites with the same category/purpose as the webpage under construction. Upon determining the source of predictive content, predictive content engine 408 can utilize data store 412 to extract data analytics associated with the predictive content. Such analytics data can indicate the success of placed content attributes (e.g., that a certain sized button has high click-through by webpage visitors).

Predictive content engine 408 can also determine whether to utilize a website in the same category for which there is little or no analytics data. For instance, predictive content engine can collect visual information about competitors' webpages to use as predictive content. While such information cannot be used to predict quantitative effectiveness of a webpage, it can be used to provide suggested edits related to potential qualitative effectiveness as related to aesthetics of competitors' websites (e.g., 95% of your competitors place the registration button in the top right of the log-in webpage, consider moving yours).

In addition, predictive content engine 408 can determine whether augment webpage content analysis system 414 should be used to generate supplemental predictive content using, for example, machine learning. One embodiment of augment webpage content analysis system 414 can be Adobe® Sensei™.

Upon the placed content engine determining attributes associated with the placed content and the predictive content engine determining predictive content, recommendation engine 410 can then determine whether a suggested edit should be generated for the placed content. In one embodiment, the recommendation engine can perform a comparison between the attributes of the placed content and attributes of the predictive content. The recommendation engine can receive the attributes of the placed content from, for example, placed content engine 406 and can receive the attributes of the predictive content from, for example, predictive content engine 408. Recommendation engine 401 can also receive analytics data associated with the predictive content from, for example, predictive content engine 408. The recommendation engine can use the analytics data to determine effective attributes for the predictive content based on, for instance, webpage visitor interactions (e.g., clicks on a button). In this way, differences between attributes of placed content and effective attributes of predictive content, as identified using analytics data, can be determined. For instance, the recommendation engine can determine that predictive content received 96% click through but differs in attributes from the placed content in that the predictive content is twice the size of the placed content.

One embodiment can also utilize supplemental predictive content using, for example, machine learning carried out by an augment webpage content analysis system such as augment webpage content analysis system 414. Such supplemental predictive content can be utilized for more complex content, such as, for example, images (e.g., utilizing insightful analytics to analyze attributes associated with an image).

Upon recommendation engine 410 performing an analysis of the attributes of the placed content, as compared to successful attributes of the predictive content, a suggested edit can be generated. In one embodiment, a suggested edit is made if the predicted success of an edit to at least one attribute exceeds a predetermined threshold (e.g., increase in effectiveness if an edit is made is predicted to increase effectiveness by less than 1% will not be recommended). It should be appreciated that such a threshold can be set to provide a suggestion if the system predicts any increase in effectiveness by the edit.

Recommendation engine 410 can present a suggested edit as content edit suggestion 416. Content edit suggestion 416 can be presented to a user in real-time upon placement of content into a webpage under construction. One manner of presenting the content edit suggestion is by presenting a pop-up near the placed content relaying the suggestion to the user. In the context of a positioning suggestion, such a content edit suggestion can also be presented through a user interface element that appears elsewhere on the webpage that indicates "drag here and drop content for better results." Content edit suggestion 416 can also present an option allowing a user to "click to apply suggested edit."

Figure 5A:
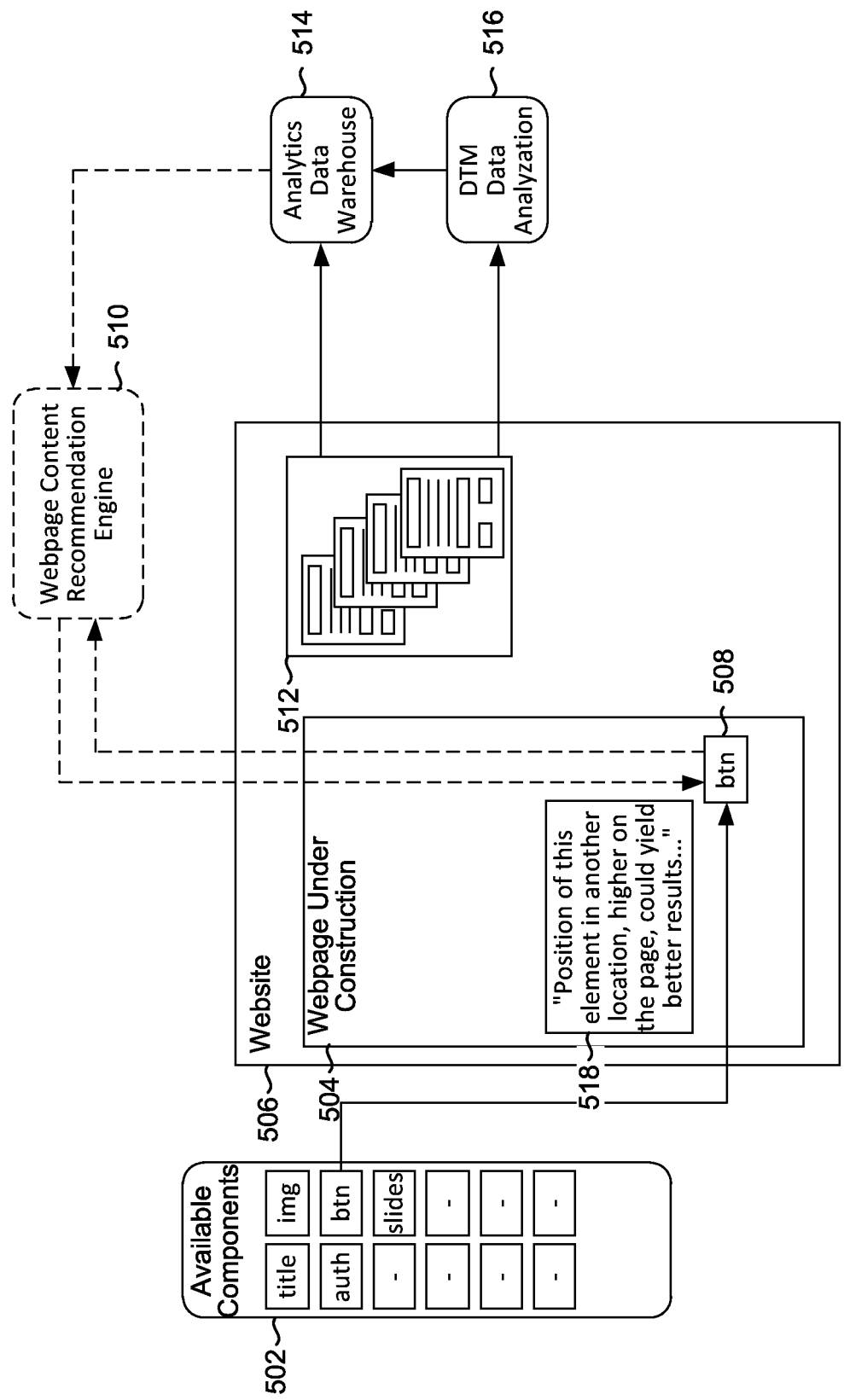
FIG. 5A depicts a webpage content recommendation environment for providing a suggested edit regarding placed content of a webpage to a user utilizing predictive content obtained from existing "live" child pages on the same website as the webpage under construction, in accordance with various embodiments of the present disclosure.
Figure 5B:
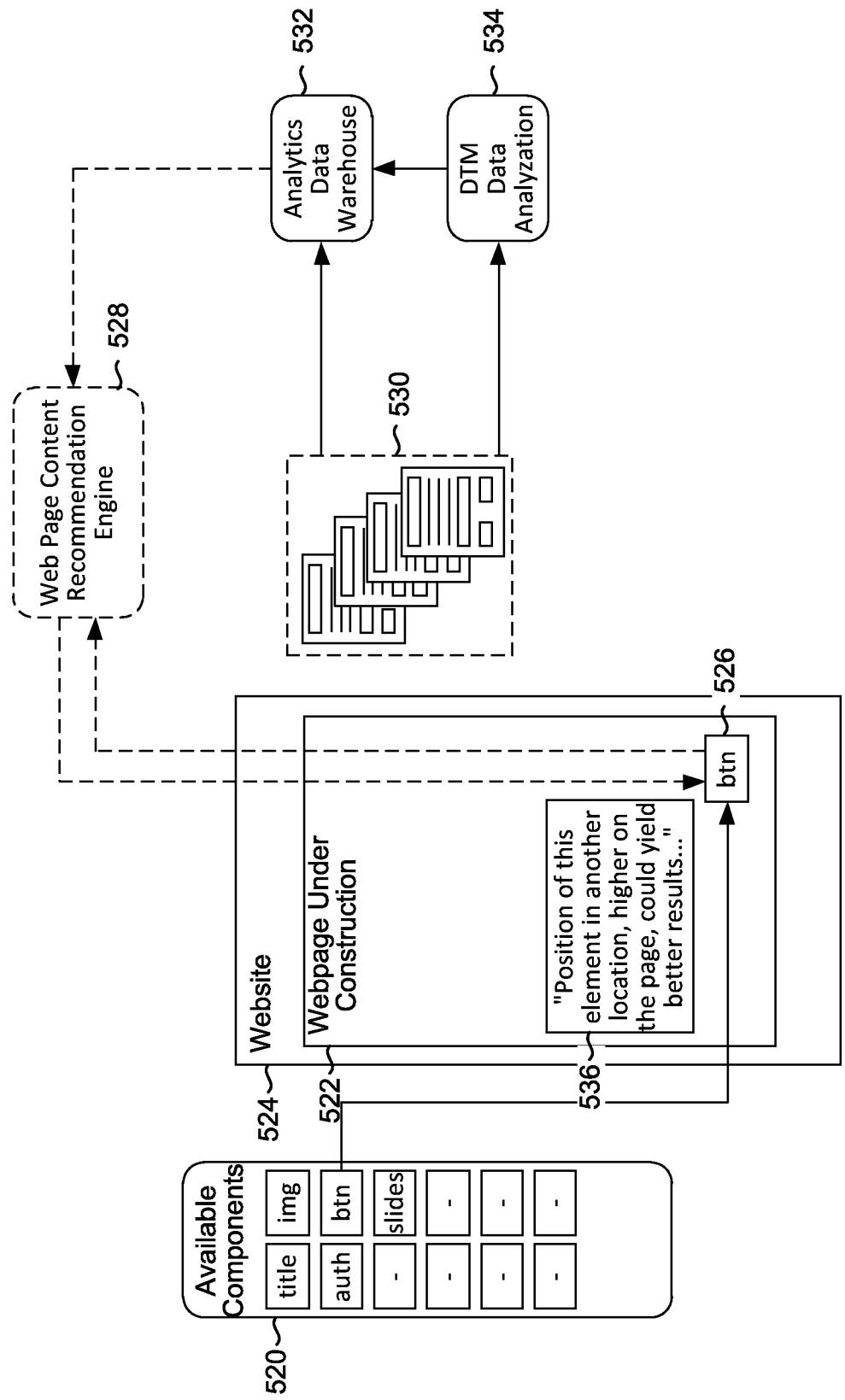
FIG. 5B depicts a webpage content recommendation environment for providing a suggested edit regarding placed content of a webpage to a user utilizing predictive content obtained from webpages in the same category as the webpage under construction, in accordance with various embodiments of the present disclosure.

FIGS. 5A and 5B depict illustrative webpage content recommendation environments for providing a suggested edit regarding placed content of a webpage to a user, in accordance with embodiments of the present disclosure. FIG. 5A depicts a webpage content recommendation environment for providing a suggested edit regarding placed content of a webpage to a user utilizing predictive content obtained from existing "live" child pages on the same website as the webpage under construction. As illustrated, available components 502 is shown with various types of components that can be added to webpage under construction 504 on website 506. Available components 502 can be provided within, for example, a web development environment that offers a drag-and-drop integrated development environment. Examples of such web development environments include AEM (Adobe® Experience Manager) Sites and Dreamweaver®.

Available components 502 can be used to place btn 508 onto webpage under construction 504. Btn 508 can be placed content, specifically a button. Upon placement of btn 508 onto webpage under construction 504, a request for suggested edits related to placed btn 508 can be sent to webpage content recommendation engine 510. Such a request can include attributes associated with btn 508, information about webpage under construction 504 and/or website 506. Attributes associated with btn 508 can include, for example, position on the page, size, coloration, text content, etc. In one instance, the request can indicate that there are deployed or existing "live" child pages 512 on website 506. The request can also include information such as a category of website 506 or webpage under construction 504.

Webpage content recommendation engine 510 can utilize information sent in a request for suggested edits to determine predictive content. Predictive content can be content that is the same, or similar to, placed content that has been added to the webpage. Predictive content can be taken from deployed or existing "live" child pages 512 on website 506.

In one embodiment, the webpage content recommendation engine can perform a comparison between the attributes of the placed content and attributes of the predictive content using analytics data associated with the predictive content. Analytics data can include visitor data, webpage component attributes, information regarding visitor interactions with webpage components, etc. from child pages 512. Such analytics data can be stored in analytics data warehouse 514. Analytics data warehouse 514 can collect information from child pages 512 such as page views, time on a page, impressions, etc. This information can be collected as page specific traffic patterns are accumulated. Analytics data warehouse 514 can also collect information after DTM data analyzation 516. DTM data analyzation 516 includes information such as page scrolls, button clicks, and content position on page, etc. DTM data analyzation 516 is collected as page specific DTM patterns are accumulated.

In this way, webpage content recommendation engine 510 can determine differences between attributes of btn 508 and attributes of predictive content, as identified using analytics data from analytics data warehouse 514. For instance, the webpage content recommendation engine can determine that predictive content placed higher on the page than btn 508 resulted in a higher button clicks.

Upon webpage content recommendation engine 510 performing an analysis of the attributes of the placed content as compared to effective attributes of the predictive content, an edit can be generated if the predicted increase in effectiveness exceeds a predetermined threshold (e.g., an edit predicted to increase effectiveness by less than 1% will not be recommended).

Suggested edit 518 can be presented to a user creating webpage under construction 504. Suggested edit 518 can be presented to a user in real-time upon placement of btn 508 into webpage under construction 504. As depicted, one manner of presenting the suggested edit is by presenting a pop-up with content relaying the suggestion to the user.

FIG. 5B depicts a webpage content recommendation environment for providing a suggested edit regarding placed content of a webpage utilizing predictive content obtained from webpages in the same category as the webpage under construction. As illustrated, available components 520 is shown with various types of components that can be added to webpage under construction 522 on website 524. Available components 520 can be provided within, for example, a web development environment that offers a drag-and-drop integrated development environment. Examples of such web development environments include AEM Sites and/or Dreamweaver®. Available components 520 can be used to place btn 526 onto webpage under construction 522. Btn 526 can be placed content, specifically a button. Upon placement of btn 526 onto webpage under construction 522, a request for suggested edits related to placed btn 526 can be sent to webpage content recommendation engine 528. Such a request can include attributes associated with btn 526, information about webpage under construction 522 and/or website. Attributes associated with btn 526 can include, for example, position on the page, size, coloration, text content, etc. The request can include information such as a category of website 524 or webpage under construction 522.

Webpage content recommendation engine 528 can utilize information sent in a request for suggested edits to determine predictive content. Predictive content can be content that is the same, or similar to, placed content that has been added to the webpage. Predictive content can be taken from webpages 530 where the webpages are in the same category as webpage under construction 522 and/or website 524. In one embodiment, the webpage content recommendation engine can perform a comparison between the attributes of the placed content and attributes of the predictive content using analytics data associated with the predictive content. Analytics data can include visitor data, webpage component attributes, information regarding visitor interactions with webpage components, etc. from webpages 530. Such analytics data can be stored in analytics data warehouse 532. Analytics data warehouse 532 can collect information from webpages 530 such as page views, time on a page, impressions, etc. This information can be collected as page specific traffic patterns are accumulated. Analytics data warehouse 532 can also collect information after DTM data analyzation 534. DTM data analyzation 534 includes information such as page scrolls, button clicks, and content position on page, etc. DTM data analyzation 534 is collected as page specific DTM patterns are accumulated.

In this way, webpage content recommendation engine 528 can determine differences between attributes of btn 526 and attributes of predictive content, as identified using analytics data from analytics data warehouse 532. For instance, the webpage content recommendation engine can determine that predictive content placed higher on the page than btn 526 resulted in a higher button clicks.

Upon webpage content recommendation engine 528 performing an analysis of the attributes of the placed content, an edit can be generated if predicted increase of effectiveness by making an edit to at least one attribute exceeds a predetermined threshold (e.g., an edit predicted to increase effectiveness by less than 1% will not be recommended).

Suggested edit 536 can be presented to a user creating webpage under construction 522. Suggested edit 518 can be presented to a user in real-time upon placement of btn 526 into webpage under construction 522. As depicted, one manner of presenting the suggested edit is by presenting a pop-up with content relaying the suggestion to the user.

Figures 6, 7:
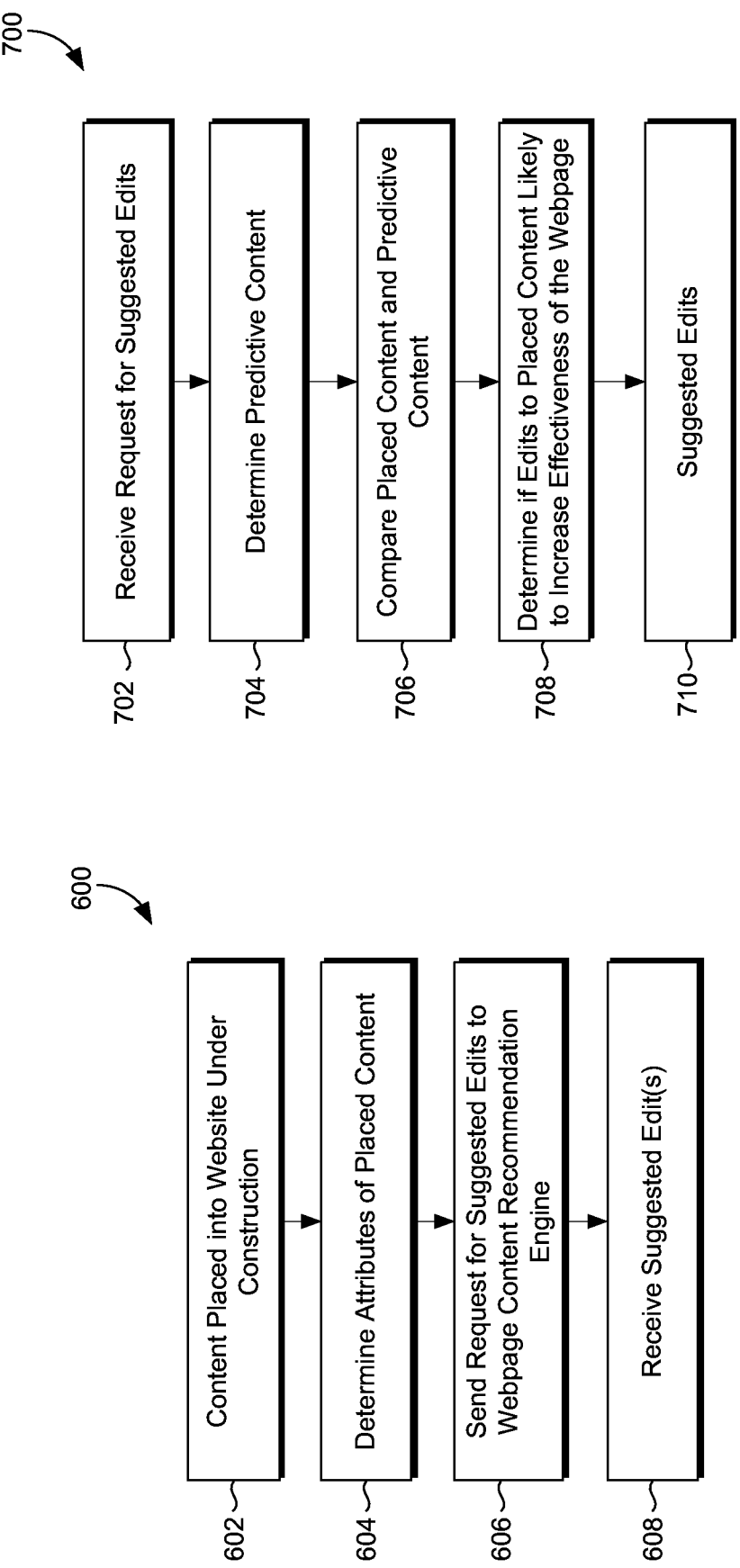
FIG. 6 illustrates a process flow depicting an example of requesting and obtaining a suggested edit for content placed into a webpage under construction, in accordance with embodiments of the present invention.
FIG. 7 illustrates a process flow depicting an example for determining a suggested edit for content placed into a webpage under construction, in accordance with embodiments of the present invention.

FIG. 6 illustrates a process flow depicting an example of a request for a suggested edit for content placed into a webpage under construction, the suggested edit predicted to increase effectiveness, in accordance with embodiments of the present invention.

As depicted, process flow 600 begins at block 602 where content is placed into a webpage under construction. Such a website can be developed using a web development environment. Examples products that offer such an environment include AEM Sites and Dreamweaver®.

At block 604, attributes for the placed content can be determined. Such attributes can include positioning on the webpage, sizing, color scheme, image features, text features, etc. Determined attributes can be based on the type of content placed into the webpage under construction. For instance, the attributes determined for a placed button can differ from the attributes determined for a placed image or an authentication log-in.

At block 606, a request for suggested edits is sent to a webpage content recommendation engine. Such a request can be sent automatically upon content being placed into a webpage under construction. Alternatively, in some embodiments, a user can designate a type of content and/or a type of content attribute for which they wish to receive suggested edits. Users can also manually indicate that they wish to receive a suggested edit for placed content.

The webpage content recommendation engine can determine whether a suggested edit should be generated for placed content. In one embodiment, the webpage content recommendation engine can perform a comparison between the attributes of the placed content and attributes of the predictive content using analytics data associated with the predictive content. In this way, differences between attributes of placed content and effective attributes of predictive content, as identified using analytics data, can be determined. For instance, the recommendation engine can determine that predictive content received 96% click through but differs in attributes from the placed content in that the predictive content is twice the size of the placed content and in the top left of the webpage, not the bottom right.

At block 608, a suggested edit can be received. The suggested edit can be presented to a user in real-time upon placing content into a webpage under construction. One manner of presenting the suggested edit is by presenting a pop-up with content relaying the suggestion to the user. In the context of a positioning suggestion, such a suggested edit can also be presented through a user interface element that appears elsewhere on the webpage at indicates "drag here and drop content for better results."

FIG. 7 illustrates a process flow depicting an example webpage content recommendation system for processing a request for a suggested edit for content placed into a webpage under construction, the suggested edit predicted to increase effectiveness, in accordance with embodiments of the present invention. Method 700 can be performed, for example, by webpage content recommendation system 208, 304, 404, 510, and/or 528 as illustrated in FIGS. 2-5B.

At block 702, a webpage content recommendation system can receive a request for a suggested edit. Such a request can be sent automatically upon content being placed into a webpage under construction. Alternatively, in some embodiments, a user can designate a type of content and/or content attribute for which they wish to receive suggested edits. Users can also manually indicate that they wish to receive a suggested edit for placed content.

At block 704, predictive content can be determined. Predictive content can be content that is the same, or similar to, the content added to the webpage. Predictive content can be taken from a webpage in the same category as the webpage (e.g., a category can be vertical sporting goods stores or healthcare providers) or from deployed pages on the same website as the webpage. Predictive content can also utilize machine learning analysis carried out by, for example, an augment webpage content analysis system. Machine learning can be used to supplemental other predictive content for more complex content, such as, for example, images (e.g., utilizing insightful analytics to analyze attributes associated with an image).

Upon determining predictive content, associated analytics data can be determined. This associated analytics data can be used to compare attributes associated with placed content with the predictive content. As such, at block 706, placed content and predictive content is compared. In one embodiment, differences between attributes of placed content and effective attributes of predictive content, as identified using analytics data, can be determined. For example, analytics data for a size attribute of predictive content, a "view next" button, can indicate that a particular size of such a button results in high-volume click-through by webpage visitors. This successful size attribute for "view next" predictive content, can be compared with the size attribute of placed content that is the same, or similar to, the predictive content, placed content that is a "view next" button. Comparing the size attribute of the predictive content with the placed content can result in a determination that changing the size attribute of the placed content is likely to increase effectiveness of the placed content.

At block 708, webpage content recommendation system can determine if edits to the placed content are likely to increase the effectiveness of the webpage. In one embodiment, the webpage content recommendation engine can perform a comparison between the attributes of the placed content and attributes of the predictive content. In this way, differences between attributes of placed content and effective attributes of predictive content, as identified using analytics data, can be determined. For instance, the recommendation engine can determine that predictive content received 96% click through but differs in attributes from the placed content in that the predictive content is twice the size of the placed content and in the top left of the webpage, not the bottom right. One embodiment can also utilize supplemental predictive content using, for example, machine learning carried out by an augment webpage content analysis system such as, for example, Adobe® Sensei™. Such supplemental predictive content can be utilized for more complex content, such as, for example, images (e.g., utilizing insightful analytics to analyze attributes associated with an image).

At block 710, upon performing an analysis of the attributes of the placed content, an edit can be generated if predicted increase in effectiveness by making edits to at least one attribute exceeds a predetermined threshold (e.g., an edit predicted to increase effectiveness by less than 1% will not be recommended). It should be appreciated that such a threshold can be set to provide a suggestion if the system predicts any increase in effectiveness by the edit.

Figure 8:
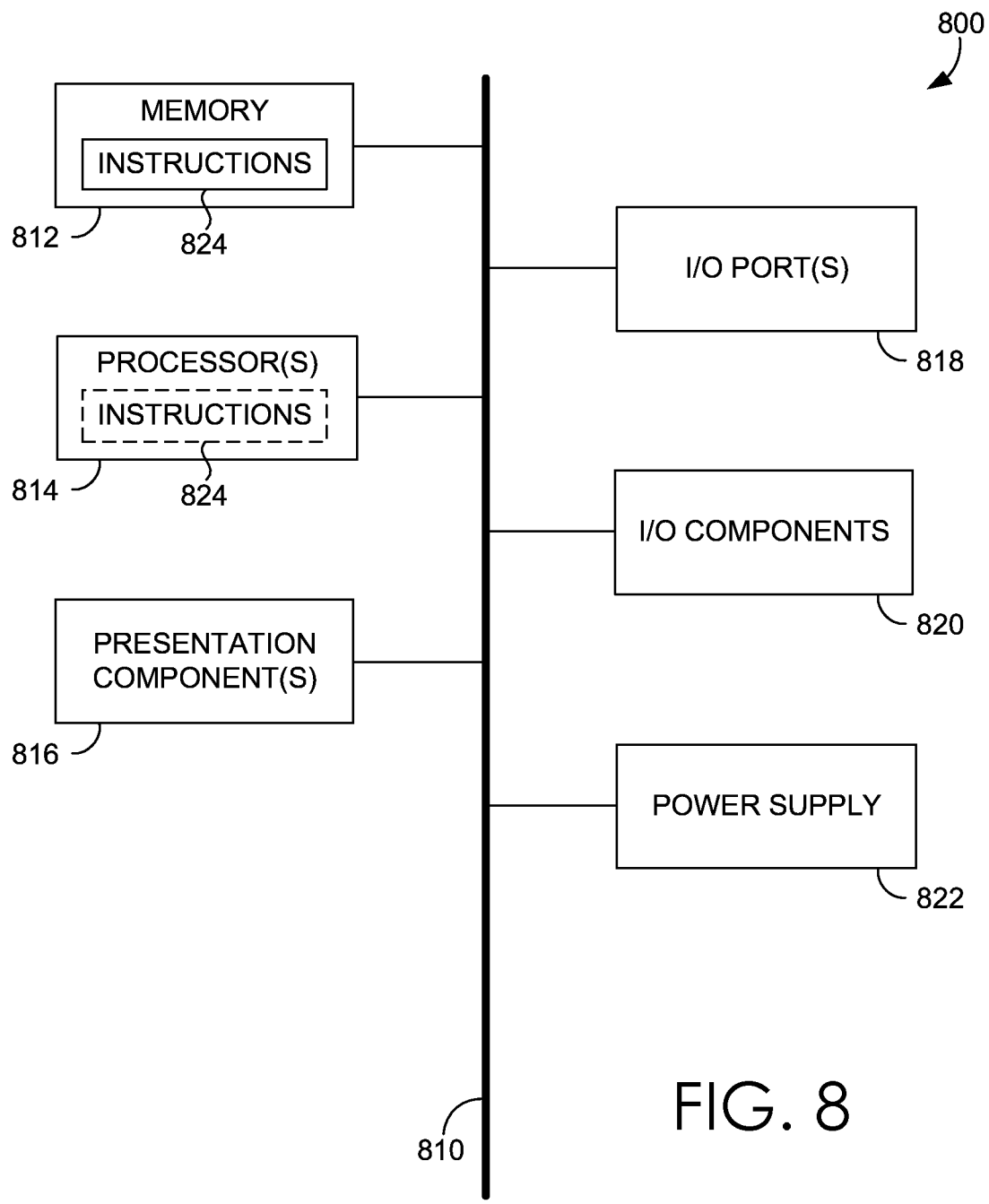
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for generating recommendations comprising:
   detecting, within a web development environment, content placed onto a webpage, wherein the placed content is added during construction of the webpage prior to deployment of the webpage;
   requesting, by one or more processors, a suggested edit predicted to increase effectiveness of the placed content, wherein the suggested edit is based on an analysis of one or more attributes associated with the placed content compared to one or more attributes of predictive content likely to increase effectiveness, wherein the predictive content is gathered from webpages of a category related to the webpage, wherein the predictive content corresponds to the placed content;
   receiving the suggested edit for at least one of the attributes associated with the placed content based on the analysis; and
   causing display of the suggested edit for the at least one of the attributes associated with the placed content prior to deployment of the webpage.

2. The computer-implemented method of claim 1, wherein the display of the suggested edit is via a graphical user interface on a user device.

3. The computer-implemented method of claim 1, the method further comprising:
   implementing the suggested edit for the at least one of the attributes associated with the placed content prior to deployment of the webpage.

4. The computer-implemented method of claim 1, the method further comprising:
   generating the request for the suggested edit immediately upon addition of the placed content into the webpage.

5. The computer-implemented method of claim 1, wherein the suggested edit is generated by:
   accessing the one or more attributes associated with the placed content;
   determining the predictive content that is that corresponds similar to the placed content;
   comparing the one or more attributes associated with the placed content to the one or more attributes associated with the predictive content; and
   generating the suggested edit for the placed content based on the comparison of the one or more attributes associated with the placed content and the one or more attributes associated with the predictive content utilizing analytics data associated with the predictive content.

6. The computer-implemented method of claim 1, wherein the predictive content is further gathered from deployed webpages of a website, the website including the webpage under construction.

7. The computer-implemented method of claim 1, wherein the analysis further takes into account content previously placed onto the webpage.

8. A non-transitory computer-readable storage medium including instructions which, when executed by a computer, cause the computer to perform operations comprising:
   receiving, from a web development environment, a request for a suggested edit predicted to increase effectiveness of content placed onto a webpage, wherein the request is sent upon detection of the placed content during construction of the webpage;
   accessing attributes associated with the placed content;
   determining predictive content, gathered from webpages of a category related to the webpage, that corresponds to the placed content;
   comparing the attributes associated with the placed content to attributes associated with the predictive content; and
   generating the suggested edit for the placed content based on the comparison of the attributes associated with the placed content and the predictive content utilizing analytics data associated with the predictive content.

9. The non-transitory computer-readable storage medium of claim 8, the operations further comprising:
   providing the suggested edit when the suggested edit is predicted to increase effectiveness by a percentage over a predefined threshold.

10. The non-transitory computer-readable storage medium of claim 8, wherein the attributes associated with the placed content include at least one of positioning on the webpage, sizing, color scheme, image features, and text features, wherein the attributes associated with the predictive content include at least one of positioning on the webpage, sizing, color scheme, image features, and text features.

11. The non-transitory computer-readable storage medium of claim 8, the predictive content further gathered from deployed webpages of a website that includes the webpage under construction.

12. The non-transitory computer-readable storage medium of claim 8, wherein the comparing further takes into account content previously placed onto the webpage.

13. A computing system comprising:
   means for generating a suggested edit related to content placed onto a webpage, the suggested edit generated in a web development environment upon adding the placed content onto the webpage, the suggested edit based on a comparison of placed content attributes with predictive content attributes utilizing analytics data to indicate success of the predictive content attributes, the predictive content gathered from webpages of a category related to the webpage;

means for causing presentation of the suggested edit upon placement of the content onto the webpage; and means for implementing the suggested edit prior to deployment of the webpage.

14. The computing system of claim 13, further comprising:

means for determining the suggested edit by:
  accessing the placed content attributes;
  determining the predictive content that corresponds to the placed content;
  comparing the placed content attributes to the predictive content attributes; and
  generating the suggested edit for the placed content based on the comparison of the placed content attributes and the predictive content attributes utilizing the analytics data associated with the predictive content.

15. The computing system of claim 13, the predictive content further gathered from deployed webpages of a website that includes the webpage under construction.

16. The computing system of claim 13, wherein the comparison further takes into account content previously placed onto the webpage.

* * * * *

UNITED STATES PATENT AND TRADEMARK OFFICE
CERTIFICATE OF CORRECTION

PATENT NO.          : 10,600,075 B2
APPLICATION NO.     : 15/713339
DATED               : March 24, 2020
INVENTOR(S)         : Jason Christopher Fabbri et al.

It is certified that error appears in the above-identified patent and that said Letters Patent is hereby corrected as shown below:

In the Claims

In Column 22, Line 5, Claim 5, after "that" delete "is that".

In Column 22, Line 6, Claim 5, before "to" delete "similar".

Signed and Sealed this
Twelfth Day of May, 2020

Andrei Iancu
*Director of the United States Patent and Trademark Office*